(12) United States Patent
Lashley et al.

(10) Patent No.: US 9,507,762 B1
(45) Date of Patent: Nov. 29, 2016

(54) CONVERTING PORTIONS OF DOCUMENTS BETWEEN STRUCTURED AND UNSTRUCTURED DATA FORMATS TO IMPROVE COMPUTING EFFICIENCY AND SCHEMA FLEXIBILITY

(71) Applicant: International Business Machines Corporation, Armonk, NY (US)

(72) Inventors: Scott D. Lashley, Portland, OR (US); John F. Miller, III, Lake Oswego, OR (US); Raghupathi K. Murthy, Union City, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/945,582

(22) Filed: Nov. 19, 2015

(51) Int. Cl.
*G06F 17/30* (2006.01)
*G06F 17/22* (2006.01)

(52) U.S. Cl.
CPC ....... *G06F 17/2264* (2013.01); *G06F 17/2247* (2013.01); *G06F 17/30* (2013.01)

(58) Field of Classification Search
CPC .................................................. G06F 17/30
USPC ........................................................ 715/234
See application file for complete search history.

(56) References Cited

U.S. PATENT DOCUMENTS

| | | | |
|---|---|---|---|
| 6,298,173 B1 * | 10/2001 | Lopresti | H04N 1/3333 358/1.17 |
| 8,255,370 B1 * | 8/2012 | Zoppas | G06F 17/3051 707/694 |
| 2006/0085402 A1 * | 4/2006 | Brown | G06F 17/2211 |
| 2007/0011175 A1 * | 1/2007 | Langseth | G06F 17/30563 |
| 2013/0166568 A1 | 6/2013 | Sowell et al. | |
| 2014/0006244 A1 | 1/2014 | Crowley et al. | |
| 2014/0136513 A1 * | 5/2014 | Ailamaki | G06F 17/30336 707/718 |

(Continued)

FOREIGN PATENT DOCUMENTS

CN 104462517 A 3/2015

OTHER PUBLICATIONS

Internet Society RFCS et al.; "JavaScript Object Notation (JSON) Patch"; An IP.com Prior Art Database Technical Disclosure; http://ip.com/IPCOM/000226419; Apr. 3, 2013.

*Primary Examiner* — Kavita Padmanabhan
*Assistant Examiner* — Tionna Burke
(74) *Attorney, Agent, or Firm* — Mohammed Kashef; SVL IPLaw Edell, Shapiro & Finnan, LLC (57) ABSTRACT

According to embodiments of the present invention, machines, systems, computer-implemented methods and computer program products are provided for converting part or all of a document from an unstructured format into a structured format, and combining structured and unstructured data into an unstructured format. In some embodiments, documents are received in an unstructured format, and stored in a repository for querying (e.g., including updating and other operations (e.g., SQL SELECT, UPDATE, INSERT, DELETE, MERGE, etc.)). Responsive to detecting a predetermined number of the documents in an unstructured format stored in a repository for querying, an optimization criteria may be applied to identify one or more components of the stored documents for conversion, and the one or more components of the stored documents are converted from the unstructured format to a structured format.

18 Claims, 9 Drawing Sheets

(56) References Cited

U.S. PATENT DOCUMENTS

2014/0207826 A1 7/2014 Gao et al.
2015/0088924 A1* 3/2015 Abadi ............... G06F 17/30979
                                                              707/769

* cited by examiner

FIG.1

| rowid | BSON |
|---|---|
| 1 | { cid: 58293, firstName: First 1, lastName: Last 1, postalcode: 93822} |
| 2 | { cid: 29482, firstName: First 2, lastName: Last 2, postalcode: "1BC248, country: "Canada" } |
| 3 | { cid: 48292, firstName: First 3, lastName: Last 3, postalcode: "krlmn", Country: "Russia", City: "Moscow", dob: "04-08-2019", lastSeen: 2013 } |
| 4 | { cid: 84729, firstName: First 4, lastName:, Last 4 0x2729108290 2af380272910829 02af380272910829 02af380272910829 02af380272910829 02af380272910829 02af380272910829 02af 380272910829 02af380272910829 02af380272910829 02af380272910829 02af380272910829 02af380) } |

| rowid | cid | Fname | Lname | BSON |
|---|---|---|---|---|
| 1 | 58293 | First 1 | Last 1 | { postalcode: 93822 } |
| 2 | 29482 | First 2 | Last 2 | { postalcode: "1BC248, country: "Canada" } |
| 3 | 48292 | First 3 | Last 3 | { postalcode: "krlmn", Country: "Russia", City: "Moscow", dob: "04-08-2019", lastSeen: 2013 } |
| 4 | 84729 | First 4 | Last 4 | { 0x2729108290 2af380272910829 02af380272910 82902af38027291082902af3802 72910829 02af380 } |

CONVERTING PORTIONS OF DOCUMENTS BETWEEN STRUCTURED AND UNSTRUCTURED DATA FORMATS TO IMPROVE COMPUTING EFFICIENCY AND SCHEMA FLEXIBILITY

BACKGROUND

Present invention embodiments relate to document storage, and more specifically, to determining which portions of a document to store in an unstructured format and which portions to store in a structured format.

Non-relational database solutions (e.g., NoSQL) increasingly utilize interchange or unstructured data formats, e.g., JavaScript Object Notation (JSON), Binary JSON (BSON), etc., for ease of data management and ease of data exchange with applications. Interchange formats such as JSON or BSON provide schema type flexibility, allowing both key-value pair types and the number of key-value pairs to be arbitrary. JSON and BSON provide flexibility to developers, allowing for data to be entered in any desired format, as corresponding schema rules are enforced during subsequent read operations (and not during write operations).

While providing flexibility, storing documents in unstructured format incurs a significant negative performance impact (especially for large datasets) during runtime evaluation of queries, as compared to traditional SQL databases having uniform rows, columns, and data types of predetermined sizes.

SUMMARY

According to embodiments of the present invention, machines, systems, computer-implemented methods and computer program products are provided for converting part or all of a document from an unstructured format into a structured format, and from a structured format into an unstructured format. In some embodiments, documents are received including at least a portion of content in an unstructured format, and stored in a repository for querying. Responsive to detecting a predetermined number of the documents in the unstructured format in the repository for querying, an optimization criteria may be applied to identify one or more components of the stored documents for conversion, and the one or more components of the stored documents are converted from the unstructured format to a structured format transparent to a querying application.

These and other aspects, features and advantages of the present invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

Generally, like reference numerals in the various figures are utilized to designate like components.

Features, elements, and aspects that are referenced by the same numerals in different figures represent the same, equivalent, or similar features, elements, or aspects, in accordance with one or more embodiments.

DETAILED DESCRIPTION

In a relational database, data is typically stored in a structured format, e.g., a columnar-based or tuple (row)-based structure. For a given column, a column name (or key) may be stored once e.g., in metadata, and any number of values may be stored within that column. Columns in a structured database generally have either a predefined fixed size or a variable field with a maximum size and known location. Accordingly, querying structured data is typically quite fast, due to being in a known location having a known size. Popular relational databases that use Structured Query Language (SQL) enforce schema-on-write implementations, in which tables with columns and predefined data types are created prior to data insertion.

In contrast, sonic databases may also support storing data in an unstructured format, such as JSON. Unstructured documents, such as JSON documents, may comprise one or more key-value pairs, with the key corresponding to a column name of a structured database and the value corresponding to a data value. Instead of storing the column name once, as in a structured relational database, for every value stored in JSON format, the corresponding column name is also stored. This kind of data representation provides schema flexibility since each row self-describes the data it stores. This representation may lead to inefficiencies in document storage as well as in accessing stored information, as a key is stored for each value, leading to a potentially large number of stored repetitive data.

While flexible schemas such as JSON provide for flexibility in key-value pair types as well as the number of key-value pairs stored in a document, storing and access of document data in an unstructured format is generally inefficient compared to tuple formats in traditional relational database systems.

A collection of documents frequently have (or may be grouped to have) one or more common keys. While schema flexibility provides for arbitrary numbers and types of key-value pairs, documents within a collection tend to exhibit similarity to each other. By identifying groups of documents having common or repeating keys within the collection of documents, these key-value pairs may be targeted for conversion into a structured format, allowing the key to be stored once for the group of key-value pairs, and leading to a reduction in utilization of memory storage, faster scans, etc. In some embodiments, keys within the group of JSON documents are identified based on selected optimization criteria. Once the keys are identified based on the selected optimization criteria, the corresponding key-value data pairs may be converted into a structured format, again allowing the key to be stored once, and the values to be stored in a column-based format. Repeating key names and values are removed from the unstructured portion of the document and placed into the structured portion of the document.

It is understood that present invention embodiments broadly apply to data in any unstructured format, including JSON, BSON, Extensible Markup Language (XML) Document Interchange Format (ODIF), and Data Interchange Format (DIF). JSON may include an ASCII representation, while BSON may include a binary representation.

Figure 1:
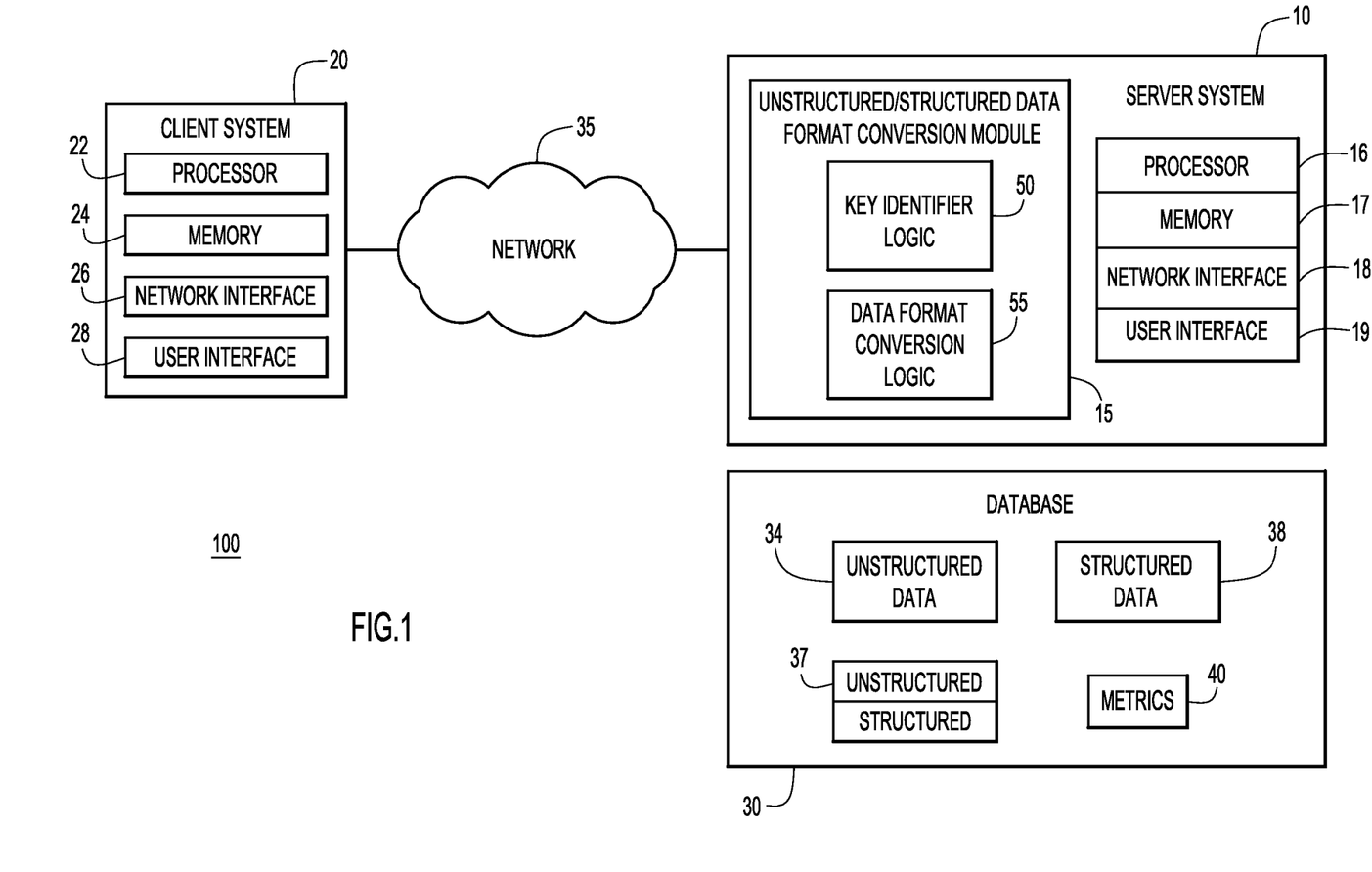
FIG. 1 is a block diagram showing an example computing system in accordance with embodiments of the present invention.

An example environment 100 for use with present invention embodiments is illustrated in FIG. 1. Specifically, the environment includes one or more server system(s) 10, and one or more client or end-user system(s) 20. Server system(s) 10 and client system(s) 20 may be remote from each other and communicate over a network 35. The network may be implemented by any number of any suitable communications media (e.g., wide area network (WAN), local area network (LAN), Internet, Intranet, etc.). Alternatively, server system(s) 10 and client system(s) 20 may be local to each other, and communicate via any appropriate local communication medium (e.g., local area network (LAN), hardwire, wireless link, Intranet, etc.).

Client system(s) 20 enable users to submit queries and retrieve documents from server system(s) 10 in response to user queries for information. The server system(s) 10 include an unstructured/structured data format conversion module 15 to convert documents or portions of documents between unstructured and structured formats.

Unstructured/structured data format conversion module 15 analyzes data stored in unstructured format, e.g., BSON, JSON, etc., and determines whether to convert a portion of or all of an unstructured document into a structured format, as well as whether to convert a portion of or all of a structured document into an unstructured format. Unstructured/structured data format conversion module 15 may also comprise key identifier logic 50 and data format conversion logic 55. Key identifier logic 50 parses documents in unstructured format to identify repeating keys. Key identifier logic 50 may also utilize metrics 40 corresponding to a frequency or a number of times that a particular key-value pair occurs in a group of documents in determining whether to convert a document from one format to another. Metrics 40 may be stored independently for each group or aggregated together for the (entire) collection of documents that have been parsed. Accordingly, metrics may include a frequency and type of a key-value pair in a group or in the entire document collection.

Once the repeating keys are identified, the corresponding key-value pairs may be provided to data format conversion logic 55 for conversion into a structured data format. Similarly, as the content of a database changes over time, it may no longer be efficient to store infrequent key-value pairs in a structured format. Accordingly, key identifier logic 50 may also identify structured data to convert back to an unstructured format, and provide the structured data to data format conversion logic 55 for conversion.

A database system 30 may store various information for the analysis (e.g., unstructured data 34, structured data 38, combination 37 of structured and unstructured data, metrics 40, etc.). The structured and unstructured data may be together or separate physically. The database system 30 may be implemented by any conventional or other database or storage unit, may be local to or remote from server system(s) 10 and client system(s) 20, and may communicate via any appropriate communication medium (e.g., local area network (LAN), wide area network (WAN), Internet, hardwire, wireless link, Intranet, etc.). The client systems may present a graphical user (e.g., GUI, etc.) or other interface (e.g., command line prompts, menu screens, etc.) to solicit information (e.g., query terms, etc.) from users pertaining to the desired documents and analysis, and may provide reports including analysis results (e.g., query results, etc.) to a user.

Server system(s) 10 may be implemented by any conventional or other computer systems preferably equipped with a display or monitor, a base (e.g., including at least one processor 16, one or more memories 17 and/or internal or external network interfaces or communications devices 18 (e.g., modem, network cards, etc.)), optional user interfaces 19 including input devices (e.g., a keyboard, mouse or other input device), and any commercially available and custom software (e.g., server/communications software, data format conversion logic 55, key identifier logic 50, and unstructured/structured data format conversion module 15, interface software, etc.).

Unstructured/structured data format conversion module 15 may include one or more modules or units to perform the various functions of present invention embodiments described herein. The various modules (e.g., unstructured/structured conversion data format module 15, key identifier logic 50, data format conversion logic 55, etc.) may be implemented by any combination of any quantity of software and/or hardware modules or units, and may reside within memory 17 of the server for execution by processor 16.

Client system 20 may be implemented by any conventional or other computer systems preferably equipped with a display or monitor, a base (e.g., including at least one processor 22, one or more memories 24 and/or internal or external network interfaces or communications devices 26 (e.g., modem, network cards, etc.)), optional user interface(s) 28 including input devices (e.g., a keyboard, mouse or other input device), and any commercially available and custom software (e.g., communications software, browser/interface software, etc.).

Figure 2A:
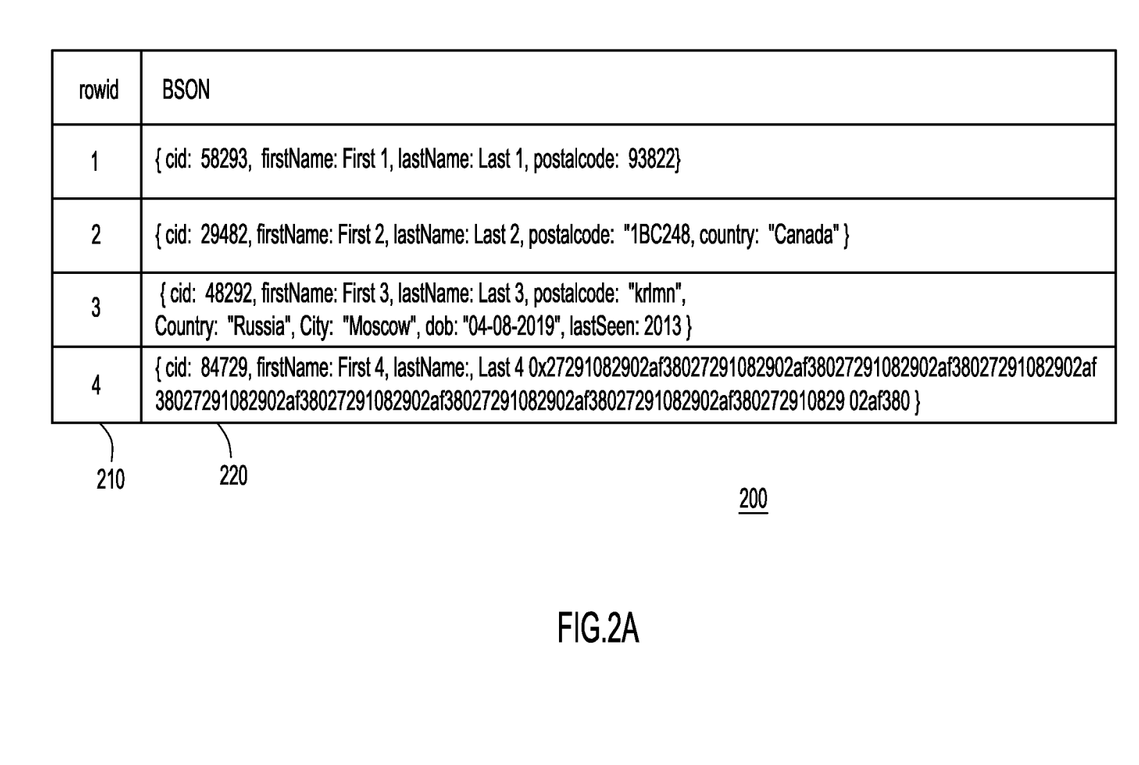
FIG. 2A is an example table showing document data in an unstructured format in accordance with embodiments of the present invention.

FIG. 2A shows an example of a table 200 comprising document data in BSON format. Each row of data is identified by a corresponding "rowid" as shown in column 210, and each corresponding data entry, in BSON format, is shown in column 220.

As shown in this example, any number of key-value pairs may be present in any given row. Rows 1-3 have keys that are common to all three rows, e.g., "cid", "firstName", "lastName" and "postalcode", and other entries, e.g., "dob", that are only found in one row. BSON allows for a flexible schema environment, in which any number and any type of key-value pairs may be present in an unstructured format.

Additionally, FIG. 2A shows an example of allowing different data types for a value, e.g., the corresponding value for key "postalcode" is provided as an integer in the first row and as a string in the second row. As type checking is not performed during data entry for JSON documents and NoSQL databases allow multiple data types for same key-value pairs, type checking may be postponed and subsequently handled during query processing.

As each JSON document may have an arbitrary number of key-value pairs that cannot be pre-determined, the JSON document is typically stored "AS IS", with key-value projections and filtering performed at runtime.

These features help create a flexible schema environment enabling agile application development, better change management, and minimization of down-time. However, this leads to a negative performance impact on processing and inefficient consumption of memory resources.

In some embodiments, the table 200 shown in FIG. 2A may be stored in a database, e.g., in a document-based or relational database supporting unstructured formats.

Figure 2B:
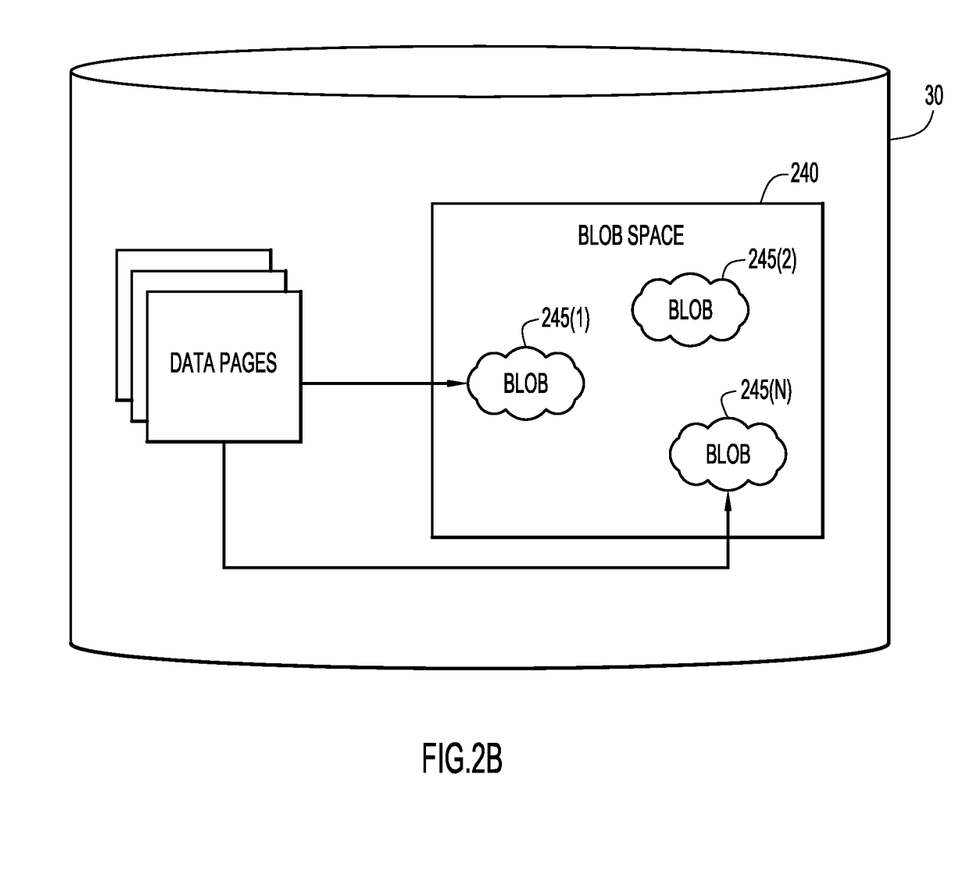
FIG. 2B is a graphical illustration, related to FIG. 2A, showing an example of storing document data in an unstructured format, in accordance with embodiments of the present invention.

FIG. 2B shows an example of another physical representation of the table 200 in FIG. 2A. In this example, the table 200 may be stored in an unstructured format in BLOB space 240, with each row stored as a separate BLOB entry 245(1)-245(N).

It is understood that this representation is not intended to be limiting. Numerous techniques and representations are available for storing tables in unstructured formats in a database.

As previously discussed, for large collections of documents, runtime analysis of the stored documents in an unstructured format to find key-value pairs relevant to a query may incur a substantial negative impact to performance, as compared to traditional relational databases with uniform rows, columns and types, as the entire collection of unstructured documents generally needs to be parsed.

Figure 3A:
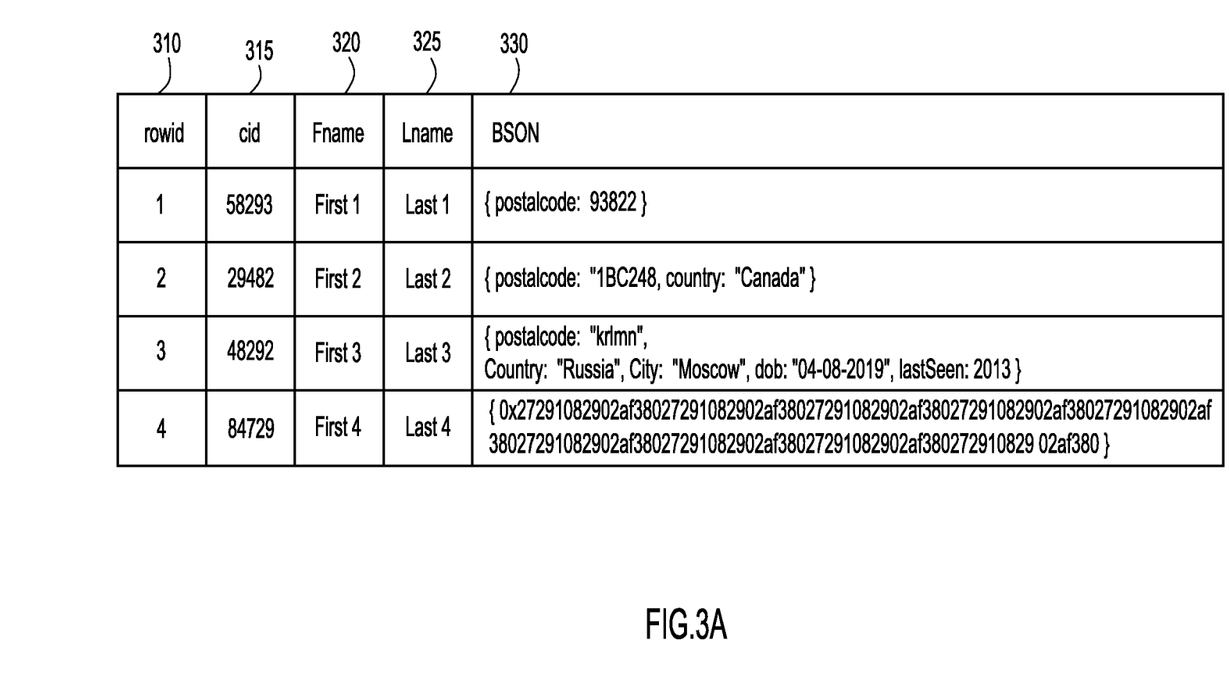
FIG. 3A is an example table showing a portion of document data, from FIG. 2A, that has been converted from an unstructured format into a structured format, in accordance with embodiments of the present invention.

Referring to FIG. 3A, an example of a table 300 is shown in which a portion of the document has been converted into a structured format. By analyzing the key-value pairs in table 200, repeating key-value pairs may be identified and converted into a structured format, based on optimization criteria. In this example, key "rowid" shown in column 310 corresponds to a row identifier. Keys identified as being common to each row of table 200, e.g., "cid", "firstName", "lastName", may be converted into structured columns 315-325, allowing the column name (e.g., "cid", "Fname", and "Lname") to be stored as metadata, and each value to be stored in the corresponding column. Key "cid" shown in column 315 corresponds to an identifier, key "Fname" shown in column 320 corresponds to a first name, and key "Lname" shown in column 325 corresponds to a last name. Data that is unique to each row may still be stored in BSON format, as shown at column 330.

Table 300 may be stored in a database that permits storage of both structured and unstructured data. In this embodiment, table 300 may be a hybrid of structured and unstructured data, with columns 315-325 stored as structured data and the unstructured data stored in column 330. Accordingly, part of the table is structured and the other part is unstructured.

Figure 3B:
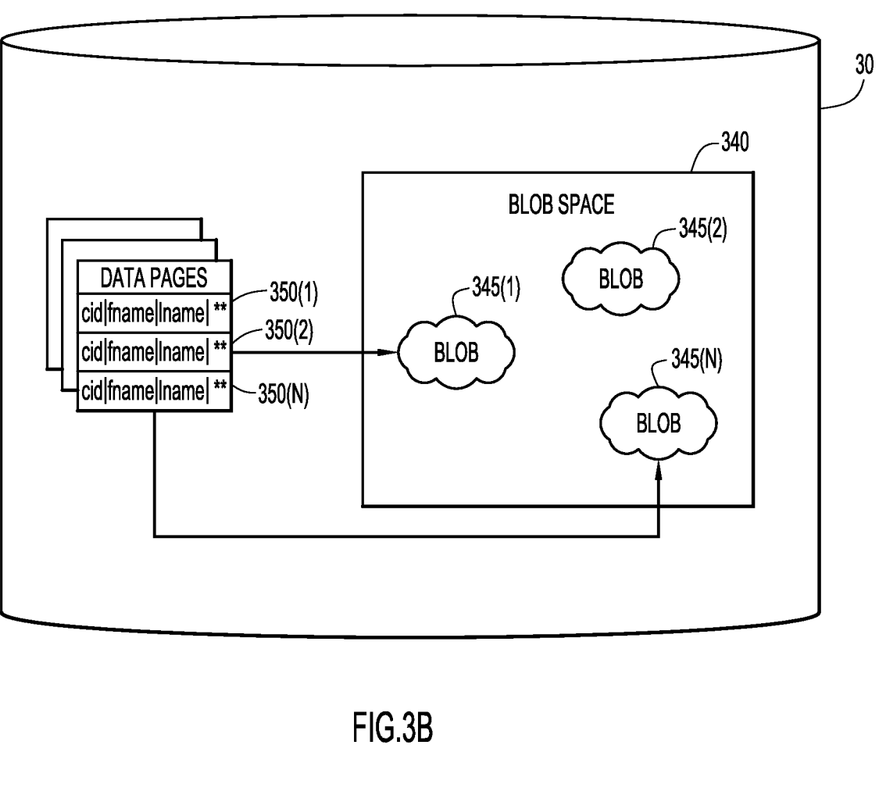
FIG. 3B is a graphical illustration, related to FIG. 3A, showing an example of storing portions of documents in a structured format and other portions of the documents in an unstructured format, in accordance with an embodiment of the present invention.

FIG. 3B shows an example of a physical representation of documents having structured and unstructured formats (as shown in FIG. 3A) stored in database 30. For example, the unstructured portion (e.g., BSON columns 330) may each still be stored in unstructured format in BLOB space 340, where each row is stored as a separate BLOB entry 345(1)-345(N). Key value pairs that have been identified as common to each row are shown as structured data. As shown in the data pages, keys "cid" "fname" and "lname" are now stored as column names in structured format, with each row entry being linked to an unstructured blob within the blob space. For example, with regard to rowid 1, the structured portion may be stored at row 350(1) of the data page and the corresponding unstructured portion stored in blob space 345(1); with regard to rowid 2, the structured portion may be stored at row 350(2) of the data page and the corresponding unstructured portion stored in blob space 345(2); with regard to rowid 3, the structured portion may be stored at row 350(3) of the data page and the corresponding unstructured portion stored in blob space 345(3), and so forth.

Thus, present invention embodiments provide for identifying and converting part or all of the documents into structured (and back into unstructured) components. This hybridized format provides for improved access and/or storage efficiency. Various types of optimization criteria may be used. As a non-limiting example, by limiting the structured component to elements that occur in each row entry (or at or above a designated frequency in a collection of documents), storage can be reduced by storing each key once (as a column name) and corresponding values in a column. Thus, instead of storing a key for each value, as in the unstructured JSON format, the key may be stored once in metadata associated with a column. Values that occur infrequently are generally maintained in an unstructured format to optimize utilization of memory. Instead of creating a column for sparse values, where the majority of entries would be null, the sparse values may be stored as a blob or in an unstructured column in a hybridized table.

Figure 4A:
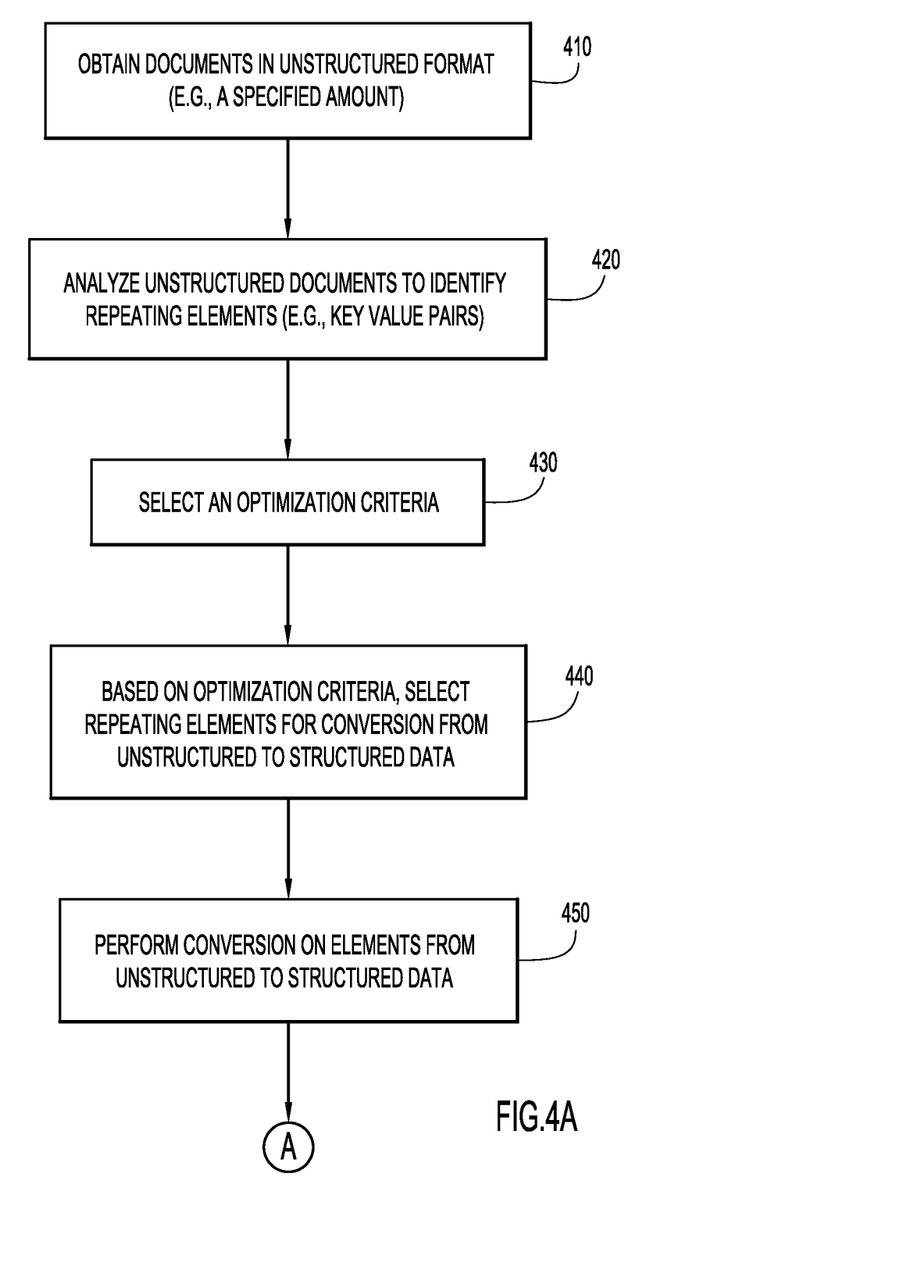
FIG. 4A is a procedural flow chart showing an example of converting document data from an unstructured format into a structured format, in accordance with embodiments of the present invention.

Referring to FIG. 4A, a flow diagram is provided, showing operations for converting part of or all of the documents in an unstructured format to documents in a structured format (e.g., via unstructured/structured data format conversion module 15 and one or more server system(s) 10), according to present invention embodiments. At operation 410, documents in unstructured format are obtained. In some aspects, a specified amount of unstructured documents (e.g., a threshold amount or number of documents) is obtained. At operation 420, the unstructured documents are analyzed to identify repeating elements, e.g., repeating key-value pairs, etc. At operation 430, optimization criteria may be selected. Various types of optimization criteria may be available, e.g., optimization criteria for minimizing memory usage, for maximizing processing speed, for maximizing speed of query/predicate evaluation, for optimizing speed of data projection/transmission to other applications, etc. Based on the selected optimization criteria, at operation 440, repeating elements may be selected for conversion from an unstructured to a structured format. At operation 450, selected elements are converted from an unstructured to a structured format, with the selected elements removed from the unstructured portion of the document. In some embodiments, this conversion on row data may occur transparently, with the repeating key value pairs stored separately in regular columns and the remaining key-value pairs stored "AS-IS" as an interchange object. This process may be performed dynamically, automatically and transparently to the application. In other embodiments, the transformation may be performed in place. Present invention embodiments allow for changing the storage layer and internal catalog information of the document data to utilize the relational form to reduce storage space and improve scan efficiency of the data.

Figure 4B:
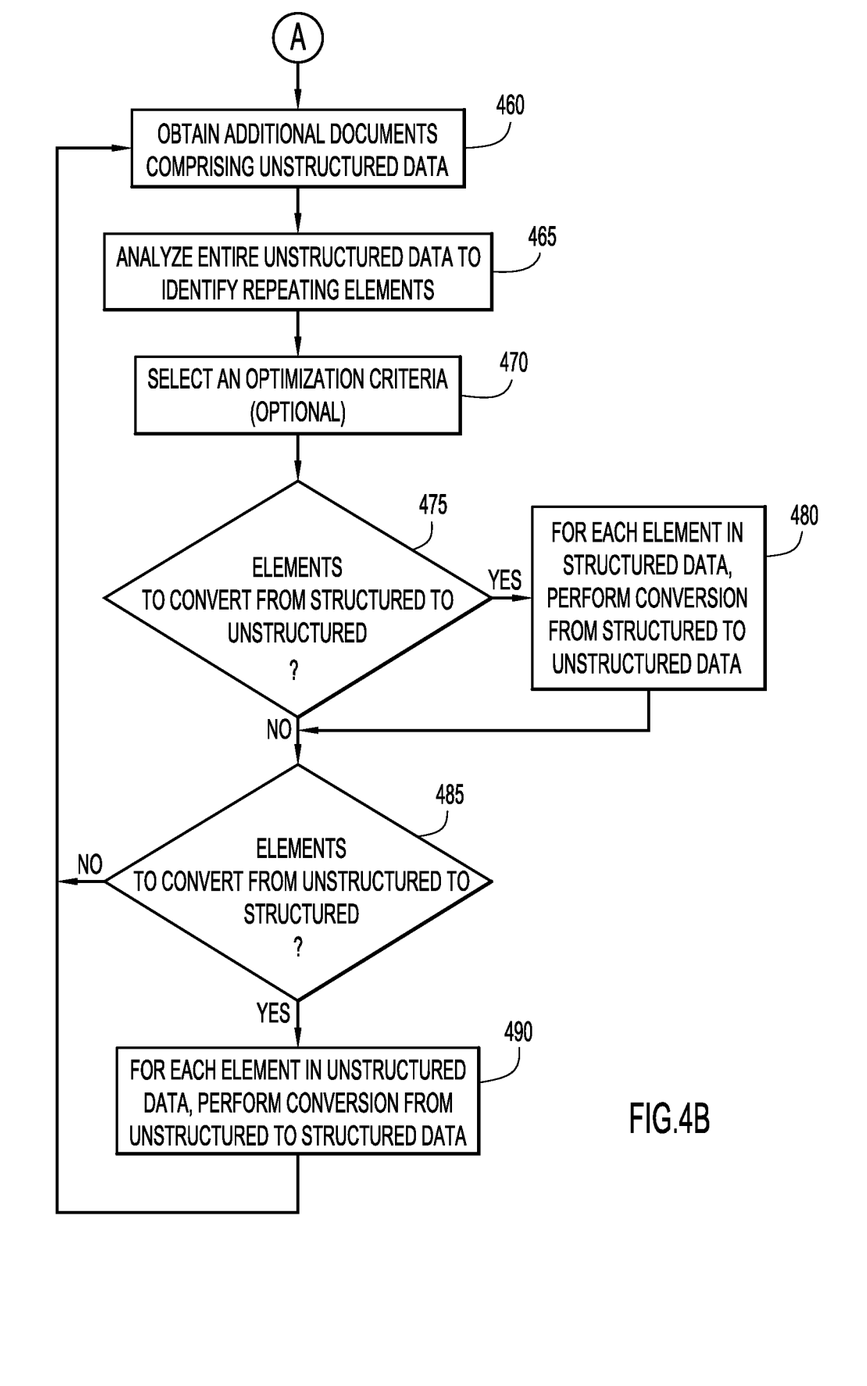
FIG. 4B is a procedural flow chart showing an example of converting document data between an unstructured format and a structured format in response to an increase in a total number of documents, in accordance with embodiments of the present invention.

As new documents are added to the system, the process may continue at block "A" (as shown in FIG. 4B).

Referring to FIG. 4B, a flow diagram is provided, showing operations for converting unstructured data to structured data, and from structured data to unstructured data (e.g., via unstructured/structured data format conversion module 15, metrics 40, and one or more server system(s) 10), according to present invention embodiments. At operation 460, additional documents comprising data in an unstructured format are obtained. In some aspects, a specified amount of documents are obtained before the unstructured data is analyzed. At operation 465, the entire set of unstructured data, including previously analyzed documents and newly added documents, are analyzed to identify repeating elements, e.g., key-value pairs, etc. In other embodiments, metrics from previously analyzed documents comprising unstructured data are stored and retrieved for later use. For example, in some embodiments, the number of times that a key-value pair appears in a set of unstructured data may be stored, and combined with metrics of newly analyzed data to determine which key-value pairs to convert to a structured form.

At operation 470, an optimization criteria may be selected. In some embodiments, the previously selected optimization criteria, selected at operation 430, may be utilized. In other aspects, a different optimization criteria may be selected.

At operation 475, a determination is made as to whether repeating elements stored as structured data are to be converted to unstructured data. When newly analyzed documents are incorporated with previously analyzed documents, a frequency of a particular key-value combination may change (e.g., increase or decrease). For example, a particular key-value pair occurring 200 times in a first set of 2000 documents may be determined to occur in 10% of the documents. When combined with a second set of 2000 documents in which the particular key-value pair occurs 10 times in 2000 documents, the particular key-value combination for both sets of documents may be determined to occur in about 5% of the documents. Accordingly, a key-value pair that was previously converted from an unstructured format to a structured format, may be converted back to an unstructured format based on selected optimization criteria, e.g., minimizing memory utilization. At operation 480 for each element identified in conjunction with operation 475, the key-value pairs in structured format are converted to an unstructured format. When converting into tuple format, the resulting value may be the actual value, NULL, or MISSING.

At operation 485, a determination is made as to whether repeating elements in an unstructured format are to be converted to a structured format. Again, once newly added unstructured documents have been analyzed and combined with previously analyzed documents, the frequency of particular key-value pairs may increase, and the particular key-value pair may be converted to structured data, e.g., to minimize memory utilization by reducing the storage of repetitive information.

At operation 490, for each element identified in conjunction with operation 485, the element is converted from an unstructured format to a structured format.

Accordingly, converting the identified key value pairs into a structured form reduces the amount of storage space needed to store the data. The key value pairs that are common to each entry may be stored in a structured component, while the key value pairs that are unique are maintained in the unstructured component. While optimizing memory utilization is one possible optimization criteria, it is understood that many other types of optimization criteria may be selected and applied.

Figure 5A:
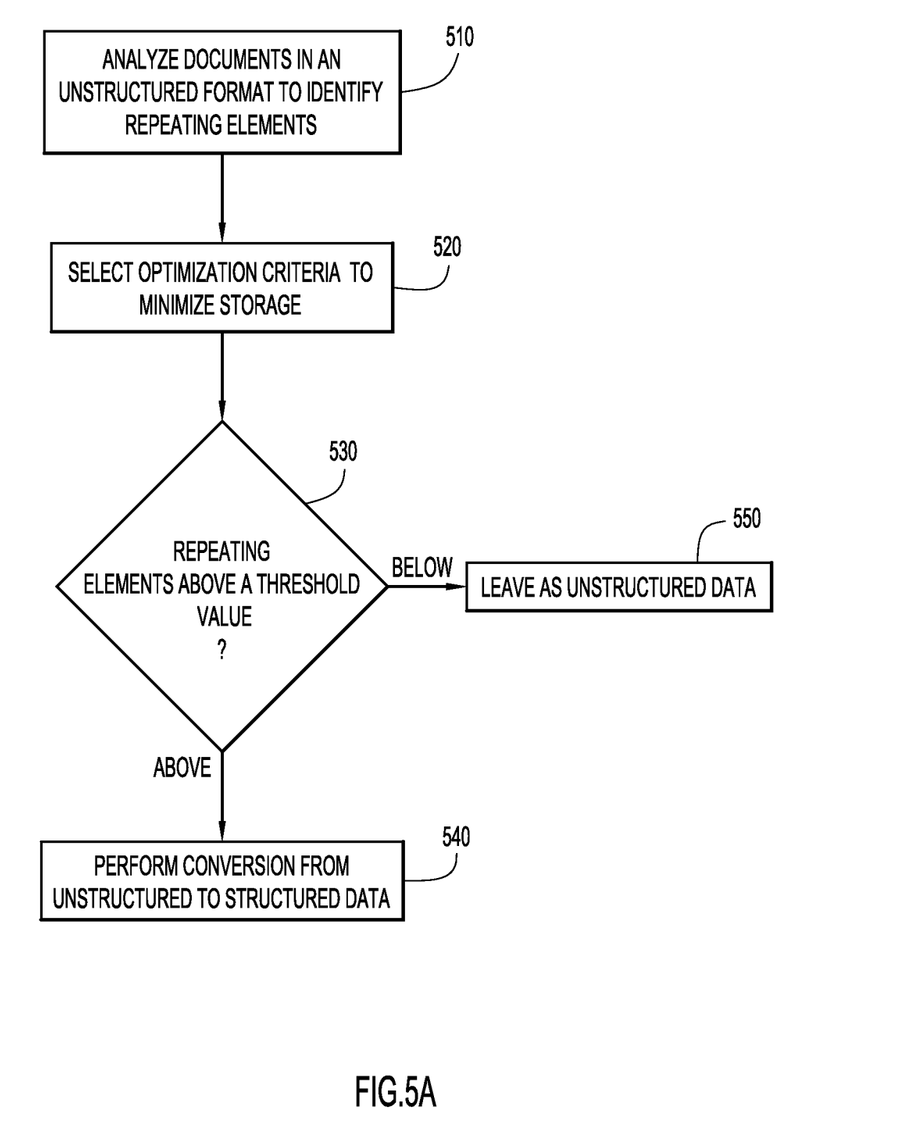
FIGS. 5A-5B are procedural flowcharts showing examples of applying optimization criteria to determine portions of documents for conversion, in accordance with embodiments of the present invention.
Figure 5B:
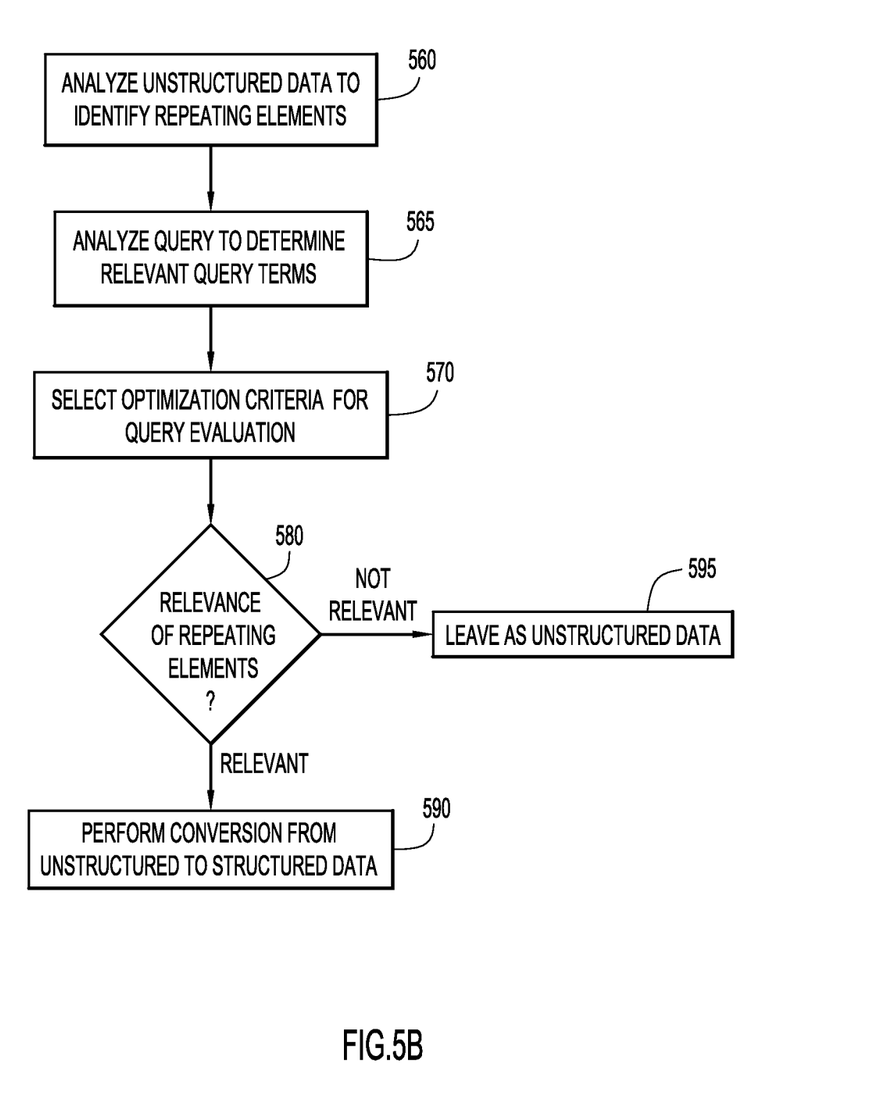

FIGS. 5A and 5B provide examples of various types of optimization criteria that may be selected. It is understood that these examples are not intended to be limiting, as numerous other types of optimization criteria may be utilized.

FIG. 5A is a flow chart showing example operations of selecting optimization criteria for minimizing storage (e.g., via unstructured/structured data format conversion module 15, metrics 40, and one or more server system(s) 10). At operation 510, documents in an unstructured format are analyzed to identify repeating elements, e.g., key-value pairs. At operation 520, an optimization criteria is selected to minimize storage. (Other examples of optimization criteria include minimizing consumed memory, minimizing query execution time/predicate evaluation time, etc.) At operation 530, repeating elements above a threshold value are selected for conversion to a structured format, and at operation 540, the selected elements are converted from an unstructured format into a structured format. At operation 550, repeating elements falling below a threshold value are maintained in an unstructured format. Accordingly, by converting repeating key-value pairs in unstructured format to structured format, memory utilization may be minimized, and storing repetitive key values may be avoided.

FIG. 5B is a flow chart showing an example of operations involved for selection of an optimization criteria to maximize speed of query processing (e.g., via unstructured/structured data format conversion module 15, metrics 40, and one or more server system(s) 10). At operation 560, documents in an unstructured format are analyzed to identify repeating elements, e.g., key-value pairs. At operation 565, a query is analyzed to determine relevant query terms. At operation 570, an optimization criteria is selected to maximize query evaluation efficiency (by reducing evaluation time). At operation 580, repeating elements that are relevant to the query are identified, and at operation 590, the selected elements are converted from an unstructured format into a structured format. At operation 595, repeating elements not relevant to evaluation of a query, even if occurring at a high frequency, may be maintained as unstructured data.

For example, by determining a number of times that a particular query is executed or is likely to be executed, and by determining an occurrence of key-value pairs in a collection of documents, a determination may be made as to whether to convert the unstructured key-value pairs into a structured form. Even if the key-value pairs occur at a relatively low rate in the document collection, query time may be improved in some cases by converting the key-value pairs to a structured format as the query engine will not need to search the entire document space for the key-value pairs (instead, the relevant column may be accessed). Accordingly, by converting relevant repeating key-value pairs in an unstructured format to a structured format, query evaluation speed may be improved. Instead of parsing a potentially large amount of unstructured data to identify key-value pairs of interest, which may be a time consuming, processing intensive process, the key-value pairs may be identified and converted to structured data for faster processing. This benefit may be further enhanced if a particular query is executed multiple times.

Advantages of present invention embodiments include: (1) more efficient data storage, as key values only need to be stored once when the data is converted into structured format; (2) simplicity, as the data may be converted into a simple relational table as needed; (3) faster index creation, as repeating key-value pairs may be converted into structured data, reducing the amount of unstructured data to be indexed; (4) allowing data to be scanned more quickly, as scanning data in a structured column is faster than parsing through large volumes of unstructured data; (5) improved data compression, as structured columns are more likely to have data that is similar in form within a particular column, increasing the likelihood that a suitable compression algorithm may be identified and applied to the data to further minimize consumed storage space; (6) ability to provide a flexible schema for a relational system automatically (e.g., ADD new columns ONLINE. Simply store/access "new" or unknown columns in a key-value portion); (7) provide better and precise metadata to applications and tools like visualization/business-intelligence tools; and (8) all the relational system features, like constraints and default values, can be enforced easily.

Conversion is typically performed automatically and transparently to the application. The application is not aware of the change in formatting, as the change in formatting may involve changes to the storage layer and internal catalog information of the document data.

It will be appreciated that the embodiments described above and illustrated in the drawings represent only a few of the many ways of implementing embodiments for improving computing efficiency by converting portions of documents between structured and unstructured data formats.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, unstructured/structured data format conversion module 15, key identifier logic 50, and data format conversion logic 55, etc.). These systems may include any types of monitors and input devices (e.g., keyboard, mouse, voice recognition, etc.) to enter and/or view information.

It is to be understood that the software (e.g., unstructured/structured data format conversion module 15, key identifier logic 50, and data format conversion logic 55, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., unstructured/structured data format conversion module 15, key identifier logic 50, and data format conversion logic 55, etc.) may be available on a icon-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files; databases, data structures, data or other repositories, etc.) to store information (e.g., unstructured data 34, structured data 38, metrics 40 associated with analysis of repeating elements from documents, optimization criteria, etc.). The database system may be implemented by any number of any conventional or other databases, data stores or storage structures (e.g., files, databases, data structures, data or other repositories, etc.) to store information (e.g., unstructured data 34, structured data 38, metrics 40 associated with analysis of repeating elements from documents, optimization criteria, etc.). The database system may be included within or coupled to the server and/or client systems. The database systems and/or storage structures may be remote from or local to the computer or other processing systems, and may store any desired data (e.g., unstructured data 34, structured data 38, metrics 40 associated with analysis of repeating elements from documents, optimization criteria, etc.).

The present invention embodiments may employ any number of any type of user interface (e.g., Graphical User interface (GUI), command-line, prompt, API, etc.) for obtaining or providing information (e.g., unstructured data 34, structured data 38, metrics 40 associated with analysis of repeating elements from documents, optimization criteria, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be generally utilized for determining whether to convert data (e.g., a document or a portion of a document) from an unstructured format to a structured format and from a structured format to an unstructured format.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having ", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a. network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for optimizing a document format in a query system comprising:
    receiving documents including at least a portion of content in an unstructured format;
    storing the received documents in a repository for querying;
    responsive to detecting a predetermined number of the documents including the unstructured format stored in the repository for querying, applying an optimization criteria to identify one or more components of the stored documents for a conversion, wherein applying the optimization criteria comprises analyzing groups of the stored documents to identify repeating key-value pairs;
    converting the one or more components of the stored documents associated with an identified key-value pair from the unstructured format to a structured format by storing a key once and corresponding values for the key in a column-based format transparent to a querying application, wherein at least one document comprises one or more converted components in the structured format and one or more components in the unstructured format; and
    removing repeating key names and values of the identified key-value pair from the unstructured portion of the stored documents associated with the identified key-value pair and placing the removed key names and values into a structured portion of those documents.

2. The method of claim 1, wherein the stored documents are in an interchange format selected from a group consisting of JavaScript Object Notation (JSON), Binary JSON (BSON), Extensible Markup Language (XML) Document Interchange Format (ODIF), and Data Interchange Format (DIF).

3. The method of claim 1, wherein the optimization criteria is selected to minimize consumed storage for the stored documents in the repository.

4. The method of claim 1, wherein the optimization criteria is selected to minimize a query time for searching the stored documents in the repository.

5. The method of claim 1, further comprising:
    receiving additional documents;
    storing the received additional documents in the repository for querying;
    applying the optimization criteria to identify one or more components of the stored additional documents for a conversion;
    combining the identified one or more components of the stored additional documents with the previously identified one or more components to select which of the combined identified components to convert from the unstructured format to the structured format; and
    converting the selected identified components from the unstructured format to the structured format.

6. The method of claim 5, further comprising:
    determining which of the combined identified components to maintain in the unstructured format;
    identifying the one or more corresponding components stored in the structured format; and
    converting the one or more corresponding components in the structured format to the unstructured format.

7. The method of claim 1, further comprising:
    analyzing groups of the stored documents for key-value pairs;
    determining metrics for each group of documents providing an indication of specified key-value pairs in that group of documents; and
    utilizing the determined metrics to determine whether to convert the one or more components of the stored documents from the unstructured format to the structured format and whether to convert the one or more components of the stored documents from the structured format to the unstructured format.

8. A system for optimizing a document format in a query system comprising:
    at least one processor configured to:
        receive documents including at least a portion of content in an unstructured format;
        store the received documents in a repository for querying;
        responsive to detecting a predetermined number of the documents including the unstructured format stored in the repository for querying, apply an optimization criteria to identify one or more components of the stored documents for a conversion, wherein applying the optimization criteria comprises analyzing groups of the stored documents to identify repeating key-value pairs;
        convert the one or more components of the stored documents associated with an identified key-value pair from the unstructured format to a structured format by storing a key once and corresponding values for the key in a column-based format transparent to a querying application, wherein at least one document comprises one or more converted components in the structured format and one or more components in the unstructured format; and remove repeating key names and values of the identified key-value pair from the unstructured portion of the stored documents associated with the identified key-value pair and placing the removed key names and values into a structured portion of those documents.

9. The system of claim 8, wherein the at least one processor is further configured to:
receive additional documents;
store the received additional documents in the repository for querying;
apply the optimization criteria to identify one or more components of the stored additional documents for a conversion;
combine the identified one or more components of the stored additional documents with the previously identified one or more components to select which of the combined identified components to convert from the unstructured format to the structured format; and
convert the selected identified components from the unstructured format to the structured format.

10. The system of claim 9, wherein the at least one processor is further configured to:
determine which of the combined identified components to maintain in the unstructured format;
identify the one or more corresponding components stored in the structured format; and
convert the one or more corresponding components in the structured format to the unstructured format.

11. The system of claim 8, wherein the at least one processor is further configured to:
analyze groups of the stored documents for key-value pairs;
determine metrics for each group of documents providing an indication of specified key-value pairs in that group of documents; and
utilize the determined metrics to determine whether to convert the one or more components of the stored documents from the unstructured format to the structured format and whether to convert the one or more components of the stored documents from the structured format to the unstructured format.

12. A computer program product for optimizing a document format in a query system, the computer program product comprising a computer readable storage medium having program instructions embodied therewith, the program instructions executable by at least one processor to cause the at least one processor to:
receive documents including at least a portion of content in an unstructured format;
store the received documents in a repository for querying;
responsive to detecting a predetermined number of the documents including the unstructured format stored in the repository for querying, apply an optimization criteria to identify one or more components of the stored documents for a conversion, wherein applying the optimization criteria comprises analyzing groups of the stored documents to identify repeating key-value pairs;

convert the one or more components of the stored documents associated with an identified key-value pair from the unstructured format to a structured format by storing a key once and corresponding values for the key in a column-based format transparent to a querying application, wherein at least one document comprises one or more converted components in the structured format and one or more components in the unstructured format; and remove repeating key names and values of the identified key-value pair from the unstructured portion of the stored documents associated with the identified key-value pair and placing the removed key names and values into a structured portion of those documents.

13. The computer program product of claim 12, wherein the stored documents are in an interchange format selected from a group consisting of JavaScript Object Notation (JSON), Binary JSON (BSON), Extensible Markup Language (XML) Document Interchange Format (ODIF), and Data Interchange Format (DIF).

14. The computer program product of claim 12, wherein the optimization criteria is selected to minimize consumed storage for the stored documents in the repository.

15. The computer program product of claim 12, wherein the optimization criteria is selected to minimize a query time for searching the stored documents in the repository.

16. The computer program product of claim 12, wherein the at least one processor is further caused to:
receive additional documents;
store the received additional documents in the repository for querying;
apply the optimization criteria to identify one or more components of the stored additional documents for a conversion;
combine the identified one or more components of the stored additional documents with the previously identified one or more components to select which of the combined identified components to convert from the unstructured format to the structured format; and
convert the selected identified components from the unstructured format to the structured format.

17. The computer program product of claim 16, wherein the at least one processor is further caused to:
determine which of the combined identified components to maintain in the unstructured format;
identify the one or more corresponding components stored in the structured format; and
convert the one or more corresponding components in the structured format to the unstructured format.

18. The computer program product of claim 12, wherein the at least one processor is further caused to:
analyze groups of the stored documents for key-value pairs;
determine metrics for each group of documents providing an indication of specified key-value pairs in that group of documents; and
utilize the determined metrics to determine whether to convert the one or more components of the stored documents from the unstructured format to the structured format and whether to convert the one or more components of the stored documents from the structured format to the unstructured format.

* * * * *